Patented Sept. 21, 1943

2,329,986

UNITED STATES PATENT OFFICE 2,329,986

WELDING ROD

John Anthony Goodford, Belleville, N. J., assignor to Crucible Steel Company of America, New York, N. Y., a corporation of New Jersey No Drawing. Application April 6, 1942, Serial No. 437,840

2 Claims. (Cl. 219—8)

This invention pertains to improvements in metallic electric arc welding, to shielded or coated metallic electrodes therefor, and to processes of welding therewith.

A primary object of the invention is to provide an improved type of shielded or coated metallic arc welding electrode and process of welding therewith, which will produce a sound weld, substantially free from cracks, and of high tensile strength and ductility or elongation, particularly as applied to the welding of ferritic base metals, such as pearlitic carbon and alloy steels, for example, alloy steels containing up to about 5 or 10% in aggregate of the usual alloying elements such as manganese, nickel, chromium, vanadium, molybdenum, copper, cobalt, etc. The invention is particularly adapted to the production of sound welds, free from cracks, between heavy sections of such base metals, such as plates, bars, etc., having a thickness up to three or four inches or more.

It has been the practice in the past to weld ferritic or pearlitic base metals of the character aforesaid with metallic welding electrodes of substantially the same analysis or composition as the base metal, or, in some instances, with a shielded or coated electrode having an austenitic steel core wire, such as one containing about 25% chromium and about 20% nickel. Such welding electrodes, especially as employed in the welding of heavy sections of ferritic or pearlitic carbon and alloy steels as aforesaid, have been found to result in unsound weld deposits, containing large longitudinal cracks, necessitating expensive and time-consuming grinding and rewelding operations.

In accordance with the present invention, it has been found that sound weld deposits, substantially free from cracks, can be obtained on or between work pieces, plates, bars, etc., of ferritic or pearlitic steel, by depositing the weld metal from a shielded or coated electrode, having an austenitic steel core wire containing about 10 to 25% chromium and about 6 to 15% nickel, and having sufficient molybdenum in the coating to deposit about 1.25 to 5%, and preferably about 1.75 to 3.25% of this metal in the weld.

A weld deposit so obtained is found to have high strength and ductility, for example, 80,000 lbs. per square inch or more in tensile strength, and an elongation of 35% or more, such that the weld and welded base metal can withstand extremely heavy impact shocks without rupture.

Particularly good results are secured from the employment of a welding electrode having an austenitic steel core wire containing about 18% chromium and 8% nickel—or such as to produce these proportions in the weld deposit—and a protective coating containing sufficient molybdenum to deposit about 2 to 3% of this element in the weld.

During the welding process, a certain amount of the molybdenum is transferred across the arc from the coating into the weld deposit, and the aforementioned mechanical properties can be met with ease, and cracking during welding of the base metal is almost entirely eliminated. The cracking here referred to does not mean the normal crater cracks of minor proportion which always occur in changing from an exhausted welding electrode to a new one, but refers rather to longitudinal cracks extending throughout the length of the weld deposit, or a large fraction thereof.

It has been found for some reason not as yet understood, that the production of sound welds, free from such longitudinal cracks, depends, in large measure, upon incorporation of the molybdenum—in requisite amounts to give the deposit analysis above specified—in the protective coating surrounding the steel core wire of the electrode, rather than in the steel core wire itself. If, for example, the molybdenum is incorporated in the core wire, the results obtained are not nearly so good.

Aside from the inclusion of molybdenum in the requisite proportions, as above specified, the protective coating for the electrode will be otherwise of usual construction and composition, containing slagging, fluxing, reducing and scavenging materials.

The molybdenum is incorporated in the protective coating, preferably in the form of ferromolybdenum, although it may be added in other forms, such as alloys, compounds, salts and mixtures, provided the balance of the coating composition is otherwise satisfactory for the proper functioning of the electrode. The amount or percentage of molybdenum incorporated in the coating will of course vary considerably with the variation in make-up and proportions of the coating compositions employed, and hence cannot be specifically set forth. The controlling factor, however, is to employ sufficient molybdenum in the coating composition to assure the deposition of about 1.25 to 5%, and preferably 1.75 to 3.25%, of this element in the weld, by weight of the total composition of the weld deposit. As stated, extremely good results are obtained with a deposition of 2 to 3% molybdenum in the weld.

The carbon content of the welding electrode may be such as to provide up to say 0.5% carbon in the weld, although ordinarily the carbon will run about 0.1%.

The employment of a welding electrode in accordance with the invention provides sound weld deposits, substantially free from longitudinal cracks, without necessity for any special welding procedure or precautions, and with the employment of the "normal welding technique" as this term is understood in the art.

By nickel, I mean a nickel-like element which is a so-called austenite former, such as nickel, manganese or copper which may totally or partially replace nickel.

I claim:

1. An electric arc welding electrode having an austenitic steel core wire containing about 10 to 25% chromium and about 6 to 15% nickel, and a protective coating therefor, said coating containing sufficient molybdenum to produce a weld deposit containing about 1.25 to 5% of this element.

2. An electric arc welding electrode having an austenitic steel core wire containing about 10 to 25% chromium and about 6 to 15% nickel, and a protective coating therefor, said coating being substantially free from alloys of nickel and chromium and containing sufficient molybdenum to produce a weld deposit containing about 1.75 to 3.25% of this element.

JOHN ANTHONY GOODFORD.